J. M. DAVIES.
HORSE BONNET.
APPLICATION FILED JAN. 29, 1910.
960,840.
Patented June 7, 1910.
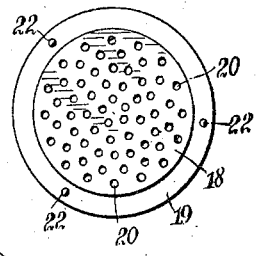
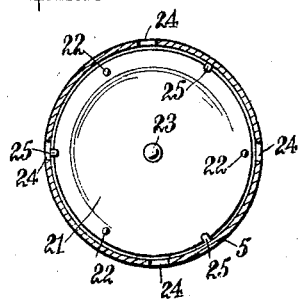
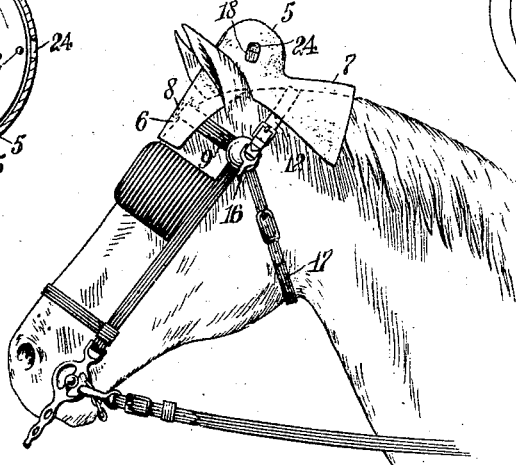
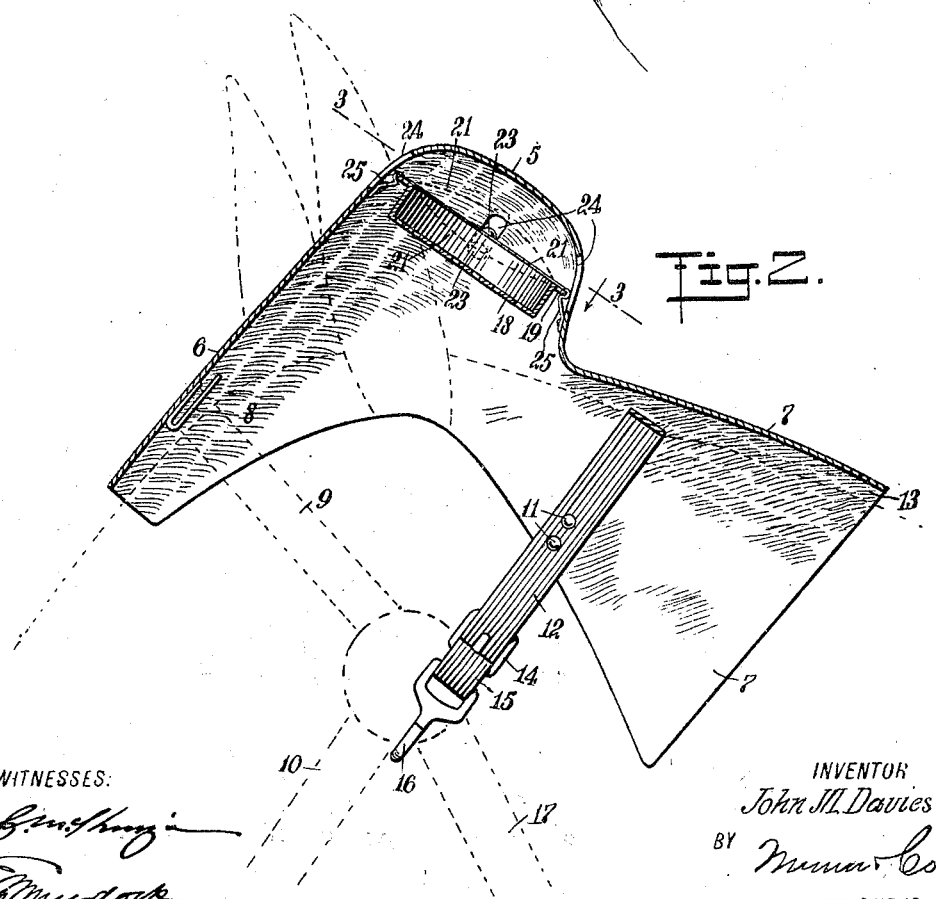
WITNESSES:
INVENTOR
John M. Davies
BY
ATTORNEYS

UNITED STATES PATENT OFFICE.

JOHN M. DAVIES, OF PLATTSBURG, NEW YORK.

HORSE-BONNET.

960,840. Specification of Letters Patent. Patented June 7, 1910.

Application filed January 29, 1910. Serial No. 540,844.

*To all whom it may concern:*

Be it known that I, JOHN M. DAVIES, a citizen of the United States, and a resident of Plattsburg, in the county of Clinton and State of New York, have invented a new and Improved Horse-Bonnet, of which the following is a full, clear, and exact description.

Among the principal objects which the present invention has in view are: to provide a bonnet for cooling the head of the horse by causing a circulation and change of the air within the bonnet; to provide a construction of diminished dimensions having greater efficiency than the larger constructions heretofore used; to provide a construction having an extended cooling area without limiting the movement of the ears of the horse; and to provide an article of the character specified the construction of which is simple, durable and efficient.

One embodiment of the present invention is disclosed in the structure illustrated in the accompanying drawings, in which like characters of reference denote corresponding parts in all the views, and in which—

Figure 1 is a pictorial view of a horse's head, illustrating the means of attaching the bonnet to the head stall of the bridle; Fig. 2 is a vertical section of the bonnet, shown on an enlarged scale and in relation to the head, neck and ears of the animal, these being indicated by dotted lines; Fig. 3 is a sectional view taken on the line 3—3 in Fig. 2, showing in plan the top of the diaphragm of the ventilator; and Fig. 4 is a bottom view of the ventilator.

The bonnet herein illustrated is constructed from suitable material, such as woven straw, to form a crown 5, a forehead shield 6 and a neck guard 7. Between the shield 6 and neck guard 7 the material is cut away to permit the crown 5 to rest between the ears of the animal without interference therewith. This shaping of the bonnet with reference to the movement of the ears of the animal avoids an annoyance which bonnets of the character specified have heretofore caused.

The shield 6 is provided with a hook 8 formed of flat thin material, in the shape shown in Fig. 2, the opening between the jaws of which is constricted to engage a stall strap 9 of the bridle 10. The shield is raised by the hook 8 slightly away from the forehead of the animal, providing thereby a passage for the circulation of air.

The neck guard 7 is fastened by rivets 11, 11 to a strap 12, and in such manner as that, when the said strap rests upon the neck of the animal, the upper portion of the shield is raised slightly from the neck to form a passage 13 for the circulation of air. The strap 12 is provided with any suitable buckle 14, and in a loop 15 is mounted a suitable hook 16. The hook 16 is formed in any manner suitable for engagement with a throat latch 17 of the bridle.

The crown 5 is shown as diminished in size to rest between the ears of the animal. Suspended within the circular part of the crown is a bellows box 18. The box 18 is shaped as shown in the drawings, having an annular flange 19 and a depended body portion provided with a series of perforations 20, 20. The perforations 20, 20 are constricted sufficiently to produce retardation and consequent rush of the air in passing into and from the chamber of the box 18. The box 18 is covered by a diaphragm 21, which is secured to the flange 19 by means of suitable fastening devices, such as rivets 22, 22. The body of the diaphragm 21 is flexed so that a certain vertical movement is permitted to the center of the diaphragm. The diaphragm is provided at the center with a suitable weight 23, as seen particularly in Fig. 3 of the drawings. As the diaphragm is raised and lowered to the positions illustrated by dotted lines in Fig. 2 of the drawings, it will be seen that the air from the interior of the bonnet is drawn within the chamber of the box 18 and expelled therefrom when the diaphragm falls to the lower of the two positions illustrated. This action causes an agitation of the air within the bonnet, producing a circulation therein eliminating a portion of the dead air and replacing the same by fresh or outer and cooler air. The circulation of the air within the crown 5 and passages in the shield 6 and guard 7 produces the usual effect of moving air, to wit, the rapid evaporation of moisture with the resultant lowering of the heat of surrounding bodies.

The crown 5 is in itself provided with orifices 24, 24, through which the heated air is permitted to escape. The orifices are placed above or at a level with the box 18, which is held in position in the crown by means of spring latches 25, 25, which are fixedly secured to the bonnet, having holding ends spring-extended therefrom. The formation of the latches 25 is best shown in Fig. 2 of the drawings.

The operation above indicated is produced by the motion of the head of the animal. In trotting or walking the horse moves his head up and down in rhythm with the movement of his legs. The weight 23, being by comparison with the diaphragm 21 heavy, and therefore inert, its tendency is to remain in the position until its inertia is overcome by positive engagement or lift on the part of the diaphragm. The result of this is that the weight 23 is drawn to the position shown in the lowermost dotted lines in Fig. 2 whenever the head of the animal is raised, thereby causing the diaphragm 21 to expel a certain proportion of the air contained in the box 18 outward therefrom and into the body of the crown 5. By this action of the diaphragm it will be seen a gentle impulse is imparted to the whole body of air contained within the crown 5, the shield 6 and the guard 7. When the animal throws his head in a downward direction the reverse of the just described action occurs, the diaphragm 21 being relatively lifted by the weight 23 to the position shown in dotted lines in said Fig. 2. With the diaphragm moving relatively to the upward position, the air within the box 18 is rarefied, causing an inflow thereto of the air contained within the crown 5, shield 6, and guard 7. This now tends to produce a current of air flowing in the direction opposite to that above set forth. The rapid succession of impulses maintains a constant but gentle circulation of the air within the bonnet and under the shield and guard, producing the cooling effect as and for the reasons above set forth.

Having thus described my invention, what I claim as new and desire to secure by Letters Patent is:—

1. A horse bonnet comprising a dome-shaped crown; a diaphragm mounted therein; and a weight attached to said diaphragm to cause the same to vibrate with the movement of the head of the animal.

2. A horse bonnet comprising a dome-shaped crown; a diaphragm mounted therein; a weight attached to said diaphragm to cause the same to vibrate with the movement of the head of the animal; and a box-like casing containing said diaphragm and having constricted openings for the passage of air.

3. A horse bonnet comprising a dome-like crown; a bellows box having constricted air passages and a movable air expelling side; means for supporting said bellows box in said crown; and means for vibrating the said movable side, said means being impelled by the movement of the head of the animal.

4. A horse bonnet comprising a dome-like crown of limited dimension adapted to rest between the ears of the animal; extended shield and guard members arranged to extend over in protecting relation the forehead and neck of the animal; a bellows box fixedly mounted in said crown, said box having constricted openings and a movable side opposed to said openings and arranged to expel the air contained in said box therethrough; and means for vibrating said movable side, said means being connected with and moved by the head of the animal.

5. A horse bonnet comprising a dome-like crown of limited dimension adapted to rest between the ears of the animal; extended shield and guard members arranged to extend over in protecting relation the forehead and neck of the animal; a bellows box fixedly mounted in said crown, said box having constricted openings and a movable side opposed to said openings and arranged to expel the air contained in said box therethrough; means for vibrating said movable side, said means being connected with and moved by the head of the animal; and means for connecting said bonnet to the bridle straps, said means arranged to support the guard and shield partly removed from contact with the head of the animal.

6. A horse bonnet comprising a dome-like crown; resilient latches fixedly mounted therein; a box bellows having an annular flange to engage in supported relation said latches, said box bellows having a perforated side and a centrally weighted diaphragm.

In testimony whereof I have signed this specification in the presence of two subscribing witnesses.

JOHN M. DAVIES.

Witnesses:
 Thos. H. Smith,
 J. F. Groner.